United States Patent [19]

Guglielmi et al.

[11] Patent Number: 4,592,533

[45] Date of Patent: Jun. 3, 1986

[54] SOLENOID-OPERATED TWO-WAY DIRECTIONAL NEEDLE-VALVE, NORMALLY CLOSED

[75] Inventors: Mauro Guglielmi, Modena; Antonio Pighetti, Formigine; Savino Vezzani; Sergio Acerbi, both of Modena, all of Italy

[73] Assignee: Edi System s.r.l., Italy

[21] Appl. No.: 418,618

[22] Filed: Sep. 16, 1982

[30] Foreign Application Priority Data

Dec. 17, 1981 [IT] Italy ................. 40128 A/81

[51] Int. Cl.4 ............... F16K 31/124; F16K 31/02
[52] U.S. Cl. ............... 251/30.01; 251/76; 251/77; 251/129.15
[58] Field of Search ............ 251/77, 129, 76, 30, 251/44, 138; 735/271

[56] References Cited

U.S. PATENT DOCUMENTS

| 1,944,113 | 1/1934 | Shenton | 251/77 |
| 2,622,618 | 12/1952 | Ghormley | 137/657 |
| 2,965,350 | 12/1960 | Knaebel et al. | 251/30 |
| 3,100,103 | 8/1963 | Bullard | 251/30 |
| 3,738,607 | 6/1973 | Peruglia | 251/45 |
| 3,970,282 | 7/1976 | Hansen | 251/30 |

FOREIGN PATENT DOCUMENTS

| 250120 | 12/1962 | Australia | 251/77 |
| 1074170 | 10/1954 | France . | |
| 1485692 | 6/1967 | France . | |
| 0034519 | 8/1981 | United Kingdom . | |

*Primary Examiner*—Martin P. Schwadron
*Assistant Examiner*—John S. Starsiak, Jr.
*Attorney, Agent, or Firm*—Darby & Darby

[57] ABSTRACT

The valve described herein comprises a movable core (28) which is drawn toward a fixed core (21) once the valve is opened by excitation of its coil, or solenoid (24). The valve's needle-obturator (17) is capable of moving axially with respect to the movable core (28) but, upon the coil's being excited, remains thrust into the orifice (16) during a first opening stage while the movable core only (28) is caused to rise. Subsequently—once the movable core (28) arrives within a few millimeters of the fixed core—a shoulder (51) offered by the movable core to a shoulder (18) incorporated in the obturator (17) duly makes contact and draws the latter upward, whereupon the action of a spring (27) overcomes such resistance as is offered by a further spring (19) and the obturator itself (17) is raised to a generous distance from its seat in orifice (16) aforesaid.

3 Claims, 3 Drawing Figures

SOLENOID-OPERATED TWO-WAY DIRECTIONAL NEEDLE-VALVE, NORMALLY CLOSED

BACKGROUND OF THE INVENTION

The invention described herein relates to a normally-closed two-port directional needle-valve, controlled by solenoid either directly, or indirectly, in which fluid under pressure is able to enter radially and exit axially or, alternatively, enter axially and exit radially.

The singular feature of this valve is embodied in the fact that the needle-obturator draws away from its relative seating to a generous distance—even using a quite low-power magnet and pressurizing fluid to some 400-bar—with the result that flow ports in the valve may range from a diameter of 1 mm for the direct-acting type up to 20 mm and more for piloted versions.

Valves of the type aforesaid in current use make provision, in basic terms, for a movable core able to travel axially and be attracted thus by a fixed core, the assembly formed by the two being ensheathed by a winding through which electric current may pass; the movable core incorporating a needle-type obturator serving to close off a fluid flow-port, and a spring compressed so as to maintain a given distance between the movable core and the fixed core.

In the case of normally-closed valves, this spring will be noticably weak, in that it serves merely to ensure engagement of the needle-obturator in its respective seating. On the other hand, once the same obturator is duly seated it falls under the thrust of fluid pressure, in consequence of which the effort produced by the solenoid must be sufficient to overcome both the strength of the spring and that of the value equivalent to: seating-section area multiplied by fluid pressure. What in fact happens is that the force with which the movable core is attracted by the fixed core becomes inversely proportionate to the distance existing therebetween—hence the maximum force of attraction between the two cores comes about once the movable core lies close as can be to the fixed core, wherefrom it will be clear that if one is seeking liberal distances on separation, the need automatically arises for solenoids of some considerable power. The drawback thus outlined imposes serious limitations on the use of this type of solenoid valve for flow rate in excess of 15 liters per minute and with fluid pressure higher than 250-bar, in that the use of over-large solenoid units would create enormous problems with regard to high input current and subsequent overheating of their coils, not to mention greater overall dimensions and the unacceptable cost increase. Another way of tackling the problem is to provide for the needle-obturator's open-stroke being limited to a few tenths of a millimeter (in such a way that the attractive force between fixed core and movable core remains markedly strong, given the closeness of the two)—although here one has other significant disadvantages—viz, considerable loss of fluid energy through choking-up of the outlet port and, worse still, problems in construction arising from extremely tight machining tolerances, perhaps leading to piece-by-piece adjustment of the valve's single components. At all events, one is left with the snag of unobtainable high flow-rates.

The overriding object of the invention described herein is that of allowing for the use of ultra-low power solenoids in conjunction with release-strokes of length such as to put as such as 3 or 3.5 mm between needle and seating upon opening of the obturator, even where fluid being checked might be pressurized to as much as 400-bar. Numerous advantages derive from this combination, amongst which the facility of holding the solenoid on-current for unlimited periods of time by virtue of its low power-consumption; reduced dimensions and significantly lower production costs; more generous machining tolerances, with no need for fine adjustments from valve to valve; handling of much higher flow-rates without significant loss of fluid power.

SUMMARY OF THE INVENTION

The above and other advantages besides are arrived at by the valve to which the invention relates, which is characterized by its comprising:

a needle-obturator capable of axial movement, with respect both to the movable core and valve proper;

reciprocating check-elements located on the needle-obturator and movable core respectively, and designed to effect a reciprocal interception whereby said movable core may carry along said needle-obturator, the reciprocal disposition of said elements being such that the movable core may intercept the obturator on arrival at a given point a short distance from the limit of its electromagnetically-induced travel toward the fixed valve core. The valve further provides for spring means such as will urge said needle-obturator towards its relative seating at the discharge orifice, and further spring means designed to urge the same said needle-obturator causing it to be raised with respect to said movable core—effort produced by the second said spring means being greater than that produced by the first said spring means—unimpeded movement of said needle-obturator being such as will permit a generous further movement upward following arrival of said movable core at the limit of its travel, brought about by electromagnet attraction as aforesaid.

BRIEF DESCRIPTION OF THE DRAWINGS

Further features and advantages of the invention described herein will emerge more clearly from the detailed description of certain embodiments which follows, these illustrated as strictly unlimitative examples with the aid of the accompanying drawings, in which.

DESCRIPTION OF THE PREFERRED EMBODIMENTS

Figure 1:
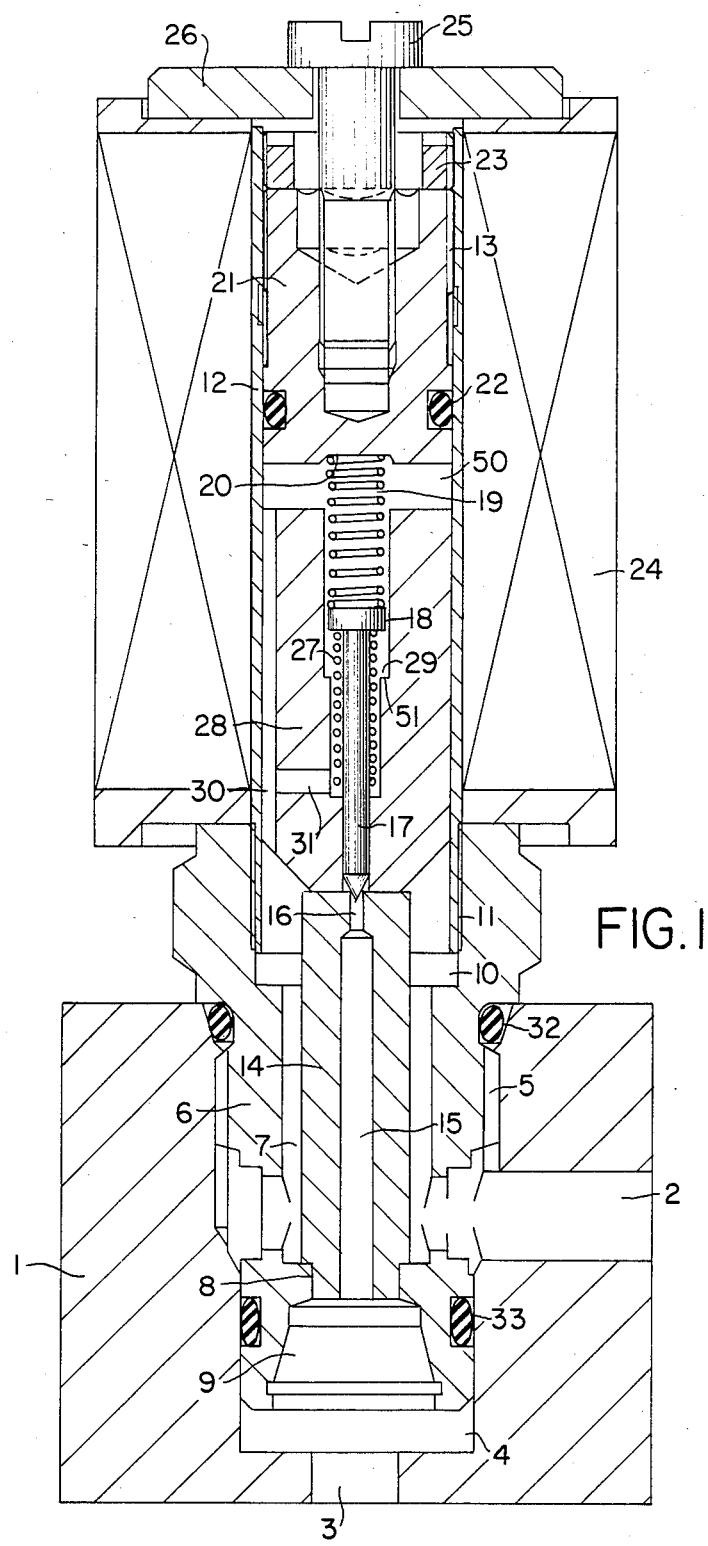
FIG. 1 shows an axial section through the vertical elevation of a first, direct-acting embodiment of the valve described herein.
Figure 2:
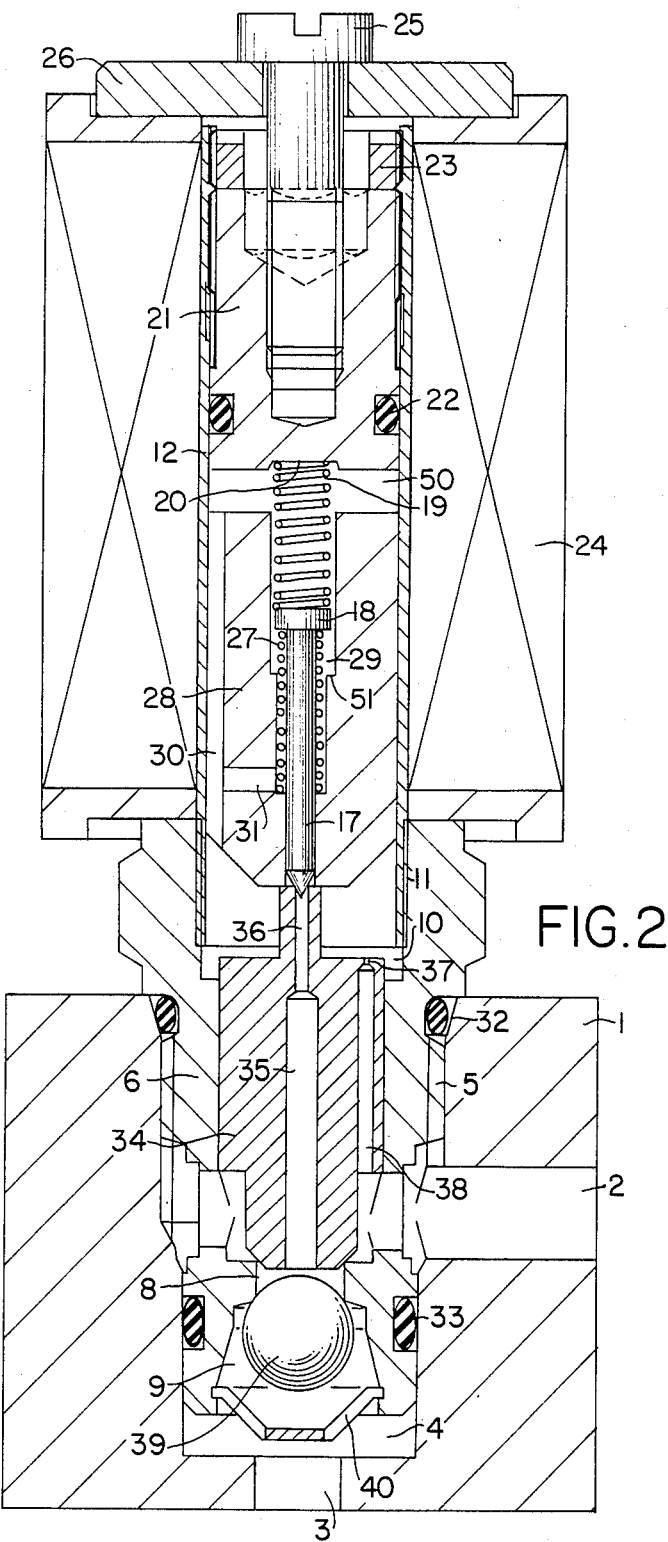
FIG. 2 and FIG. 3 both show like axial sections of the valve in vertical elevation, in two differing pilot-operated embodiments.
Figure 3:
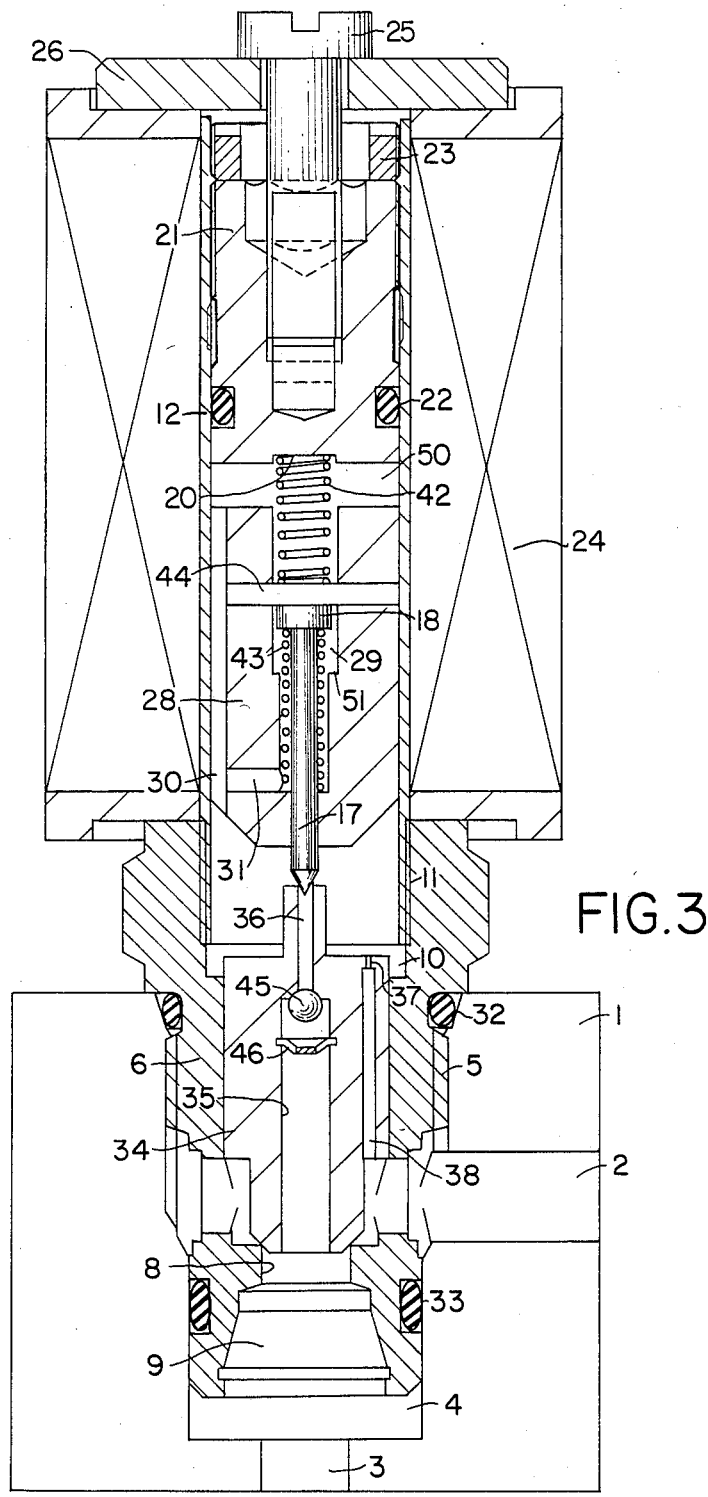

The embodiment illustrated in FIG. 1 is especially intended for very small flow-rates of around 2 liters per minute, whilst those illustrated in FIGS. 2 and 3 utilizing a pilot—still adopting the same basic valve body as in FIG. 1—are able to offer considerably higher flow capacity (circa 40 lt/min) at fluid pressure in the region of 400-bar. The safe basic group of components seen in FIG. 1 can in fact be used in a whole range of normally-closed pilot-operated solenoid valves increasing in size up to a flow-rate handling capacity of some 300 lt/min. In the case of the embodiment in FIGS. 2 and 3, provision is made for a one-way valve capable of checking flow from the axial duct.

For the sake of convenience, throughout the description and claims which follow, the valves will be referred to as they appear in the drawings, i.e. as having a "top" and "bottom" part in terms of distance and orientation—although it should be made clear at the outset that the valve may well assume a different working position once carried into effect—viz, inclined, horizontal, or even up-turned through 180°.

With reference to FIG. 1: 1 denotes a valve body in which an inlet port 2 for fluid under pressure is located, likewise an outlet port 3 for outflow of the same fluid.

Outlet port 3 gives out from the bottom of a cavity 4 threaded at point 5 and engaging thus with a further body 6, this in its turn exhibiting a cavity 7 narrowing down into the hole denoted by 8 and then widening out into another cavity 9 which duly gives out into cavity 4.

Cavity 7 widens out at 10 and is threaded at 11, engaging thus with a tube 12 in stainless steel or other such non-magnetic material which exhibits a further threaded portion 13. A stem 14, fixed immovably into and forming a tight seal with hole 8, is possessed of an axial duct 15 terminating uppermost in an orifice 16 which offers the seating in which the needle-obturator point 17 is engaged. Stem 14 in fact closes off cavity 7 at the level of hole 8, thus obliging fluid entering through inlet port 2 to travel along cavity 7 itself and flow into section 10, whence it passes through orifice 16 aforesaid and down through duct 15 into cavity 9 before exiting finally by way of outlet port 3.

21 denotes a fixed core made from ferromagnetic material and lodged in the upper region of the cavity afforded by tube 12, where it is made fast to an electromagnetic coil 24 ensheathing said tube 12. 28 denotes a movable core located within tube 12 and occupying the space existing between the upper surface of stem 14 and the lower surface of said fixed core 21, said space affording freedom of axial movement to the movable core 28, which is possessed of a cavity 29 located along its internal axial length so as to accommodate a needle-type obturator 17, the latter having the ability to move with respect to said movable core 28. The lower part of cavity 29 narrows down relatively in section, producing a shoulder 51 in consequence, a matching shoulder 18 being presented thereto by the upper part of said obturator 17. The shoulder denoted 51 is designed to engage shoulder 18 when the movable valve core rises upward in response to the attraction brought about by the fixed core, and these shoulders 51 and 18 constitute first reciprocal check means.

To the top side of shoulder 18 one has a weak coil spring 19 housed in a recess 20 offered by fixed core 21, the latter being threaded at 13 and fitted with a seal 22, a locking ring 23 with outer thread serving to lock the fixed valve core tight once set at the desired adjustment. The solenoid coil itself 24 rests upon body 6 aforementioned and is bolted fast thereto by means of a machine screw 25 tightened into fixed core 21 and at the same time pressing down on a washer 26 holding fast the upper part of said coil 24.

To the lower side of shoulder 18 on obturator 17, one has a compressed coil spring 27 seated in movable core 28, whose natural tendency is to urge obturator 17 upwards. The movable core further comprises a longitudinal hole 30 positioned parallel with cavity 29, which places section 10 in direct communication with section 50 lying between the lower face of fixed core 21 and the upper face of movable core 28. Communication between hole 30 and cavity 29 is brought about by way of a radially-disposed hole 31 located therebetween at a given point below shoulder 51.

Two seals 32 and 33 ensure a fluid-tight fit between valve-body 6 and the outside, and between cavity 4 and the fluid inlet port 2, respectively.

Referring now to FIG. 2: amongst other slight variations here, stem 14 is replaced by a piloted piston-type obturator 34 which slides within cavity 7 whilst creating a tight seal therewith. When obturator 34 is in its lowered position the way is cut off between inlet port 2 and cavity 9, whilst raising of the obturator causes the two to communicate, with fluid passing straight from port 2 into cavity 9 and out through port 3. Obturator 34 has an axial duct 35 terminating uppermost in orifice 36 which duly offers the seat wherein obturator 17 engages by its pin-point. A second duct 38 located in obturator 34 and disposed parallel with hole 35 causes inlet port 2 to communicate direct with section 10, said duct 38 exhibiting a bottleneck portion 37 of diameter marginally less than that presented by orifice 36.

A ball 39 of suitable diameter is lodged in cavity 9 and held thus by means of a holed plate 40, this arrangement allowing the passage of fluid from inlet port 2 to outlet port 3, but not the other way about.

Referring now to FIG. 3, it will be seen that there are two basic differences between this embodiment and that illustrated in FIG. 2.

The first such difference is that provision is made for a pin 44 located within movable core 28 in such a way that, by its making contact with the uppermost surface of shoulder 18, the upward stroke of obturator 17 becomes limited with respect to said movable core 28. The distance between pin 44 and shoulder 51 is greater than the depth of shoulder 18 to an extent that obturator 17 is permitted a marked freedom of axial movement with respect to the movable core 28—in other words, the obturator 17 is able to move on upward to a generous degree once movable core 28 itself has been fully attracted by fixed core 21 theretoward by means of electromagnetic excitation (as will be made plain shortly). Spring 19 in FIGS. 1 and 2 is replaced by a spring 42 compressed between the lower face of fixed core 21 and pin 44 and set so as to exert a weak effort designed to urge movable core 28 downward. In place of spring 27 in FIGS. 1 and 2 one has a further spring 43 seated within movable core 28 in such a way as to exert a weak effort serving to raise obturator 17, bringing the latter to bear against pin 44 aforesaid. Shoulder 18 and pin 44 constitute the second reciprocal check means as aforementioned. This variant could equally well be applied to the embodiment illustrated in FIG. 1.

The second difference seen in FIG. 3 is in fact only relevant to the type of valve as shown in FIG. 2. In this case, ball 39 disappears and a smaller ball 45 is inserted into duct 35, the result being that when fluid shapes to pass from duct 35 to orifice 36, the ball comes to rest in a seating located at the point where orifice 36 gives out into duct 35, thus impeding the flow of hydraulic fluid therethrough. In this way, ball 45 performs the function of a small one-way valve serving to check the flow of fluid upward through 35 and 36. Provision is made for a stop-element 46, located in duct 35, by means of which to keep the ball 45 from dropping when fluid either flows downward or is at standstill—at any rate, stop-element 46 does nothing whatsoever to restrict the flow of hydraulic fluid one way or the other.

The application of this second variation in embodiment is quite independent of that of the first variation described.

The valve thus described to which the invention refers functions in the following manner:

Referring to the first embodiment illustrated in FIG. 1, as long as the coil 24 remains disexcited, needle-obturator 17 is maintained in position closing off orifice 16—thanks to the agency of spring 19 which urges down on the top face of shoulder 18 and, more significant yet, by the downward thrust of pressurized fluid which, entering the valve by way of inlet port 2, fills cavity 10 and all parts of the valve-interior communicating therewith by circulating through holes 30 and 31. The distance between the upper face of movable core 28 and the lower face of fixed core 21 (about 3 mm) is at this point a few tenths of a millimeter more than that existing between shoulders 18 and 51. When the coil 24 is excited, movable core 28 is drawn towards fixed core 21, at the outset overcoming the somewhat weak resistance offered by spring 27—remembering that obturator 17 will in practice be subject to a downward thrust being equal to orifice section-area multiplied by fluid-pressure. Thus, in this first instant, only the movable core itself is raised, compressing spring 27 in the event—seeing that the obturator is still urged downward; then, as movable core 28 all but makes contact with fixed core 21, shoulder 51 bears upon obturator-shoulder 18 and draws needle-obturator 17 upwards thus, freeing the passage through orifice 16. Orifice 16 is freed by the obturator, therefore, only when the movable core draws as close as can be to the fixed core—i.e. when attractive force between cores 21 and 28 is notably strong—assisted further by the fact that shoulder 51 comes up against shoulder 18 with a certain amount of kinetic force; hence one is provided with a set of conditions in which it becomes possible to raise the valve-obturator 17, even though subject to a considerable amount of fluid pressure holding it fast in closed position, by means of a relatively low-power coil. Once obturator 17 is in fact clear of the seating in orifice 16, inlet port 2 is placed in communication with outlet port 3 and the obturator surface itself pinned down by the force of fluid under pressure—held in perfect hydrostatic balance, in fact—the result being that lower spring 27, now able to exert a force greater than top spring 19, prevails over the latter and causes the obturator 17 to remain thus raised and clear of its seating for as long as the spring itself 27 remains distended to the full. These being the prevailing conditions in the valve, the flow port created at orifice 16 allows maximum passage-through of fluid, and the latter may pass on from inlet port 2 down to outlet port 3 without any hindrance whatsoever to flow being presented by the point of obturator 17.

Referring now to FIG. 2, the only difference one has is that the obturator, or piloted piston 34 is held fast by fluid pressure from inlet port 2 as long as the solenoid remains disexcited—fluid in this case passing through duct 38 and bottleneck 37, the result being that it is pressed down onto its seating at hole 8—remembering at the same time that needle-obturator 17 inserts to a tight fit within orifice 36 by virtue of the agency of spring 19 whose effect is to bear down simultaneously on both obturator 17 and movable core 28. In this state, fluid entering the valve by way of inlet port 2 is completely checked.

By exciting coil 24, the same chain of events is produced as described formerly for the embodiment in FIG. 1, with obturator 17 disengaging altogether from orifice 36 and section 10 and the rest of the valve-interior becoming de-pressurized by dint of the fact that fluid-power-loss through bottleneck 37 —whose diameter is less than that of orifice 36—creates a marked difference in pressure between inlet port 2 and valve-interior 10. As a result of the difference in section between seating 8 and cavity 7 wherein obturator 34 slides and fits exactly, the latter becomes subject to fluid pressure such as lifts it clear from seating 8 aforesaid. This done, the flow-port created between inlet and outlet ports 2 and 3 is considerable in size, and any loss in fluid power or other passive resistance will be entirely dependent upon the proportions of inlet port 2, seating 8 and the rest of the fluid-line downflow of cavity 9.

The ball 39 rests nicely on its plate 40 and offers no resistance to the fluid's passage—indeed it serves to check the flow of fluid in the reverse direction, should this be a requirement.

Looking now at the first variation as described for the embodiment in FIG. 3, the valve's function differs as a result only inasmuch as, when the solenoid is disexcited, obturator 17 is kept tight in orifice 36 by the agency of spring 42 which urges movable core 28 downwardly, this in turn urging down the obturator-shoulder 18 by way of pin 44 and causing the obturator-point to protrude beyond the lower face of said movable core 28. Thus, with coil 24 and fixed core 21 excited, a first stage sees only the movable core move upward whilst obturator 17 remains thrust against orifice 36 by fluid power, thereby compressing both spring 43 and spring 42 —which in any case offer only limited resistance. Once obturator 17 is in fact separated from its seat in orifice 36 by dint of shoulder 51 coming up against shoulder 18, spring 43 aforesaid proceeds to raise said obturator 17 still further with respect to the movable core—there being no resistance offered by a spring 19 as in FIGS. 1 ahd 2—up to the point where it makes contact with pin 44, thus affording maximum flow-passage possible through orifice 36.

The variation in embodiment described thus renders the obturator's final position opportunely dictated by pin 44 and, moreover, there exists no need for setting up the amount of reciprocal thrust generated by springs 42 and 43 since these operate independently of one another. In effect, one has greater degrees of precision and reliability in operation than with the embodiments illustrated in FIGS. 1 and 2.

It will be clear that this first variant might equally well be applied to the embodiment in FIG. 1.

As far as the second variant in FIG. 3 is concerned, it will be observed that the purpose behind this is one of widening the scope of usefulness with respect to the valve in FIG. 2.

Given the absence of ball 39 from the valve, and fluid directed from port 3 toward port 2, the following occurs: coil 24 being disexcited, obturator 34 is duly raised by fluid pressure alone as a result of the latter being pumped into the valve through cavity 9, and the passage of fluid from port 3 to port 2 is ensured, whilst with coil 24 excited this passage is by no means ensured and the valve's performance is rendered somewhat uncertain in view of the fact that its moving parts become subject to gravitational force (especially obturator 34)—hence its disposition on installation becomes a decisive factor.

On the other hand, the valve as embodied in FIG. 3 not only maintains its normally-closed directional pilot-operated function intact with fluid-flow from port 2 to port 3, it also allows for passage of fluid from port 3 to port 2 when installed any-way-about, and with solenoid excited or otherwise, with no problems whatever of the type aforementioned. If, in fact, fluid is pumped from port 3 toward port 2 then cavity 9 becomes pressurized and, since ball 45 will allow no passage through orifice 36 of fluid, valve-interior 10 is reduced to almost nil-pressure by dint of its communicating with port 2 via duct 38, —thus: the greater degree of pressure at work on the underside of obturator 34 brings about raising thereof and frees the flow-port from 3 to 2 for the hydraulic fluid. When fluid is directed from port 2 to port 3, the valve reverts to its designated normally-closed directional function, and obturator 34 duly checks the flow of fluid as described at the outset.

Attention should be drawn to the unified nature of components described in the specification, and to their extreme simplicity and interchangeability from from one to another of the three embodiments shown. The only change between these three is in fact body portion 6, —in which obturator 34 is interchangeable. Furthermore, differing forms of embodiment can be put together for pilot operation in which hydraulic and electrical parts 25, 26, 23, 21, 22, 19, 24, 17, 27, 42, 43 and 47 in the upper section of the valve may remain unchanged, whilst lower valve-parts may be varied in accordance with the flow-rate required.

Moreover, the valve as described furnishes the singular possibility of putting a generous distance between obturator 17 and its relative seating—even utilizing a lower-power solenoid—notwithstanding the hydraulic circuit being driven at high pressure and producing a markedly fast flow-rate.

What is claimed is:

1. A valve formed with an inlet and an outlet and comprising:
   an actuating coil that can selectively be placed in deenergized and energized states;
   a core mounted adjacent to said coil for movement between a first position and a second position and moving from said first position to said second position in response to placement of said coil in said energized state;
   a valve member movably mounted adjacent to said core;
   a seat for said valve member, said valve member being engageable with and disengageable from said seat and said inlet and outlet being isolated from each other when said valve member engages said seat and in communication with each other when said valve member is disengaged from said seat;
   first biasing means engaging said valve member and effective when said valve member is disengaged from said seat for imparting additional movement to said valve member away from said seat;
   second biasing means engaging said core and effective when said coil is in said de-engerized state for returning said core to said first position;
   first check elements formed on said valve member and on said moveable core and engageable with each other when the movable core nears said second position; and
   at least one second check element mounted on the movable core and engageable with the first check element of the valve member for urging the valve member toward said seat upon placement of said coil in said de-energized state.

2. A valve as defined in claim 1 wherein the movable core has formed axially therein a cavity; and wherein the first check element of the valve member is in the form of a shoulder formed on the valve member and having upper and lower surfaces, the first check element of the movable core is in the form of a restriction in the cavity of the movable core, and the second check element is in the form of a pin which bridges the cavity and is adapted to engage the upper surface of the shoulder thereby limiting the travel of the valve member relative to the movable core, the distance between the restriction and lower surface of the shoulder being less than the distance between the lower surface of the actuating coil and the upper surface of the movable core when said coil is in said de-energized state, and the distance between the pin and the upper surface of the shoulder being such as to permit the valve member to travel relative to the movable core.

3. A valve, which comprises:
   a valve body, the valve body having an inlet port and an outlet port formed therein;
   an actuating coil that can be selectively placed in de-energized and energized states;
   a core mounted to the valve body adjacent to the coil for movement between a first position and a second position and moving from the first position to the second position in response to placement of the coil in the energized state, the valve body defining an interior area adjacent to the movable core;
   a first valve member movably mounted to the core;
   a second valve member movably mounted to the valve body, the second valve member having formed therein an orifice, the first valve member being partially received by the orifice in response to placement of the coil in the deenergized state, the second valve member further including a first duct for placing the outlet port in communication with the orifice, and a second duct for placing the inlet port in communication with the interior area adjacent the movable core, the second duct including a bottleneck portion having a smaller diameter than the diameter of the orifice;
   an automatic one-way valve, the one-way valve including a ball lodged within the first duct;
   first biasing means engaging the first valve member and effective when the coil is in the energized state for imparting movement to the first valve member away from the orifice;
   second biasing means engaging the movavle core and effective when the coil is in the de-energized state for returning the core to the first position;
   first check elements formed on the first valve member and on the movable core and engagable with each other when the movable core nears the second position; and
   at least one second check element mounted on the movable core and engagable with the first check element of the first valve member for urging the first valve member toward the orifice upon placement of the coil in the de-energized state.

* * * * *